UNITED STATES PATENT OFFICE.

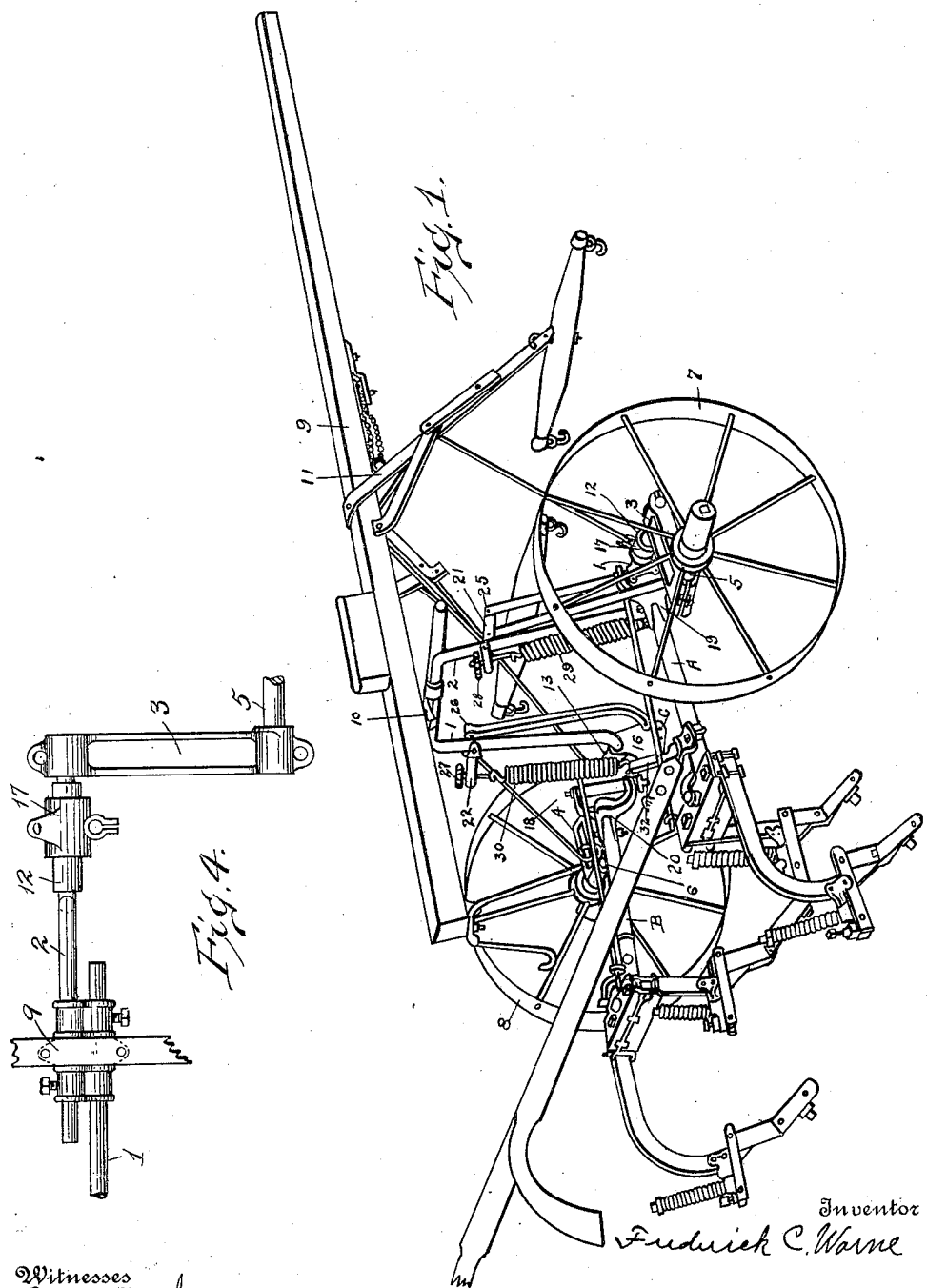

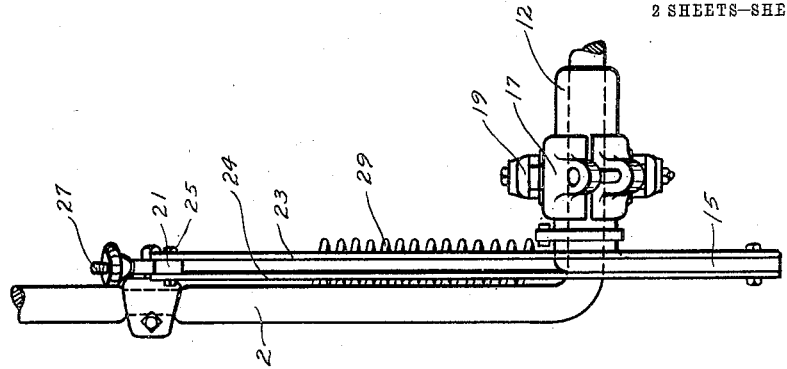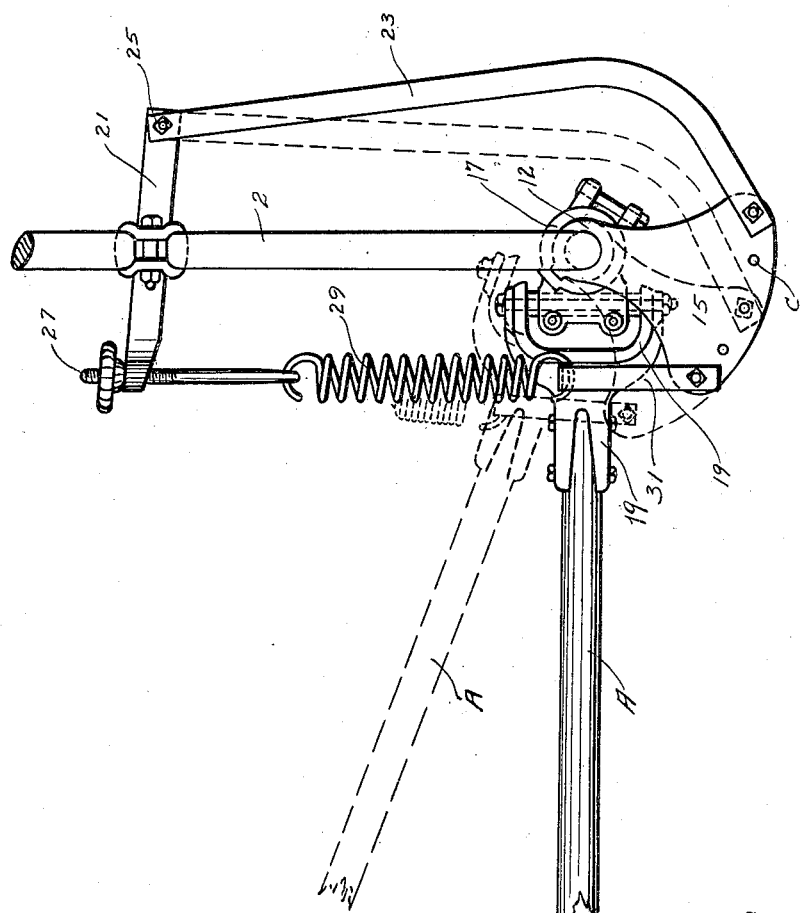

FREDERICK C. WARNE, OF MANSFIELD, OHIO, ASSIGNOR TO THE RODERICK LEAN MANUFACTURING COMPANY, OF MANSFIELD, OHIO, A CORPORATION OF NEW JERSEY.

CULTIVATOR.

1,104,027.　　　　　Specification of Letters Patent.　　Patented July 21, 1914.

Application filed October 1, 1912. Serial No. 723,411.

*To all whom it may concern:*

Be it known that I, FREDERICK C. WARNE, a citizen of the United States of America, residing at Mansfield, in the county of Richland and State of Ohio, have invented certain new and useful Improvements in Cultivators, of which the following is a specification.

My invention relates to cultivators of the balanced type.

The objects of my improvement are to provide a cultivator with means to equally balance the frame and the beams carrying shovels forward and in the rear of the axles preparatory to operating the shovels of the beams in the soil or lifting them out of working position; to provide means of sustaining the beams in their inoperative position without manual assistance; to provide means of keeping the beams and frame in balance during the time the shovels are being forced to penetrate the soil more or less in the cultivating operation; to provide means of increasing or decreasing the lifting power of the balancing mechanism; to provide means of relieving the weight on the neck of the animal in transmitting the pull to the cultivator and preventing the pole from vibrating or flying up; to provide means of neutralizing the balancing mechanism to permit the beams to be operated without resistance and independent of the balancing mechanism.

Having these and other objects in view, my invention consists of the parts and combination of parts, as hereinafter described and more particularly pointed out in the claims at the end of this specification.

In the accompanying drawings, Figure 1 is a perspective view of a walking cultivator to which my invention is applied. Fig. 2 is a side view of the balancing mechanism showing one of the beams in full lines neutral position preparatory to being operated and in dotted lines in operative position. Fig. 3 is an end view of Fig. 2. Fig. 4 is an enlarged fragmentary detail view.

Referring to the drawings, reference numerals 1 and 2 indicate parts of a yoke which are connected together and arranged to be adjusted laterally if desired. To the outwardly projecting bent ends of the yoke, clamping brackets 3 and 4 are securely attached, extending in a rearward direction. Axles 5 and 6 are securely attached to the free ends of the brackets and wheels 7 and 8 mounted thereon. A pole 9 is secured to the yoke by the brackets 10 and carries a hitching device 11. Sleeves 12 and 13 which are provided with cranks 15 and 16 (preferably made in the form of a sector) are journaled on the outwardly projecting bent ends of the yoke. Coupling members 17 and 18 embrace and are rigidly secured to the sleeves in any well known manner preferably by being keyed thereto as shown. The connecting coupling members 19 and 20 are attached to the extremities of the beams A and B and provide connecting means between the coupling members 17 and 18 and the sleeves. Bars 21 and 22 are pivoted to the side members of the yoke leaving their free ends extending on each side thereof. Swinging bars 23 and 24 having their lower ends curved are pivotally and removably supported on bolts 25 and 26 which are carried by the forwardly extending ends of the pivot bars 21 and 22. The curved ends of the bars 23 and 24 are pivotally connected to the sector cranks at the forwardly extending radii thereof with reference to the axis of the bent ends of the yoke members. The rearwardly extending ends of the pivotal bars 21 and 22 are provided with apertures to receive the adjustable bolts 27 and 28 and are connected to coil springs 29 and 30. Link bars 31 and 32 are connected to one end of the coil springs and to the rearwardly extending radii of the sector crank with reference to the axis of the bent ends of the yoke member. The sector cranks are provided with a series of apertures C.

I will now describe the operation of the balancing device but will only describe the operation of one beam and its connecting mechanism as it will be understood that both beams and their connecting mechanism are exact duplicates of each other in structure as well as operation and function.

Especial attention is now called to Fig. 2 of the drawings. When the beam A is in the position shown in full lines, the tension of the spring 29 and the weight of the beam A and its attachments are substantially equalized or what may be called neutral, that is, the weight of the beam and its attachments are counterpoised by the tension of the spring. When the beam A is raised by the operator to the position shown in dotted lines, the sleeve 12 is partially revolved carrying the sector crank rearward of the axis of the bent end of the yoke member upon which it is mounted in the direction of the spring and its connections, the swinging bars, the spring and its connections to the sector crank and pivotal bar 21 are then free from resistance and permit the spring to exert its tension to lift and maintain the beam and its attachments in inoperative position, as shown in dotted lines. When it is desired to place the beam (or beams) in operative position, movement is imparted to the beam forcing it in a downward direction partially revolving the sleeve and carrying the sector crank in a forward direction forcing the swinging bars forward of the axis of the bent end of the yoke and tending to lift and partially revolve the sector crank in an upward direction forward of the axis of the bent end of the yoke thereby relieving the beam and its attachment of the tension of the spring.

It will be observed that increased or decreased leverage can be obtained to increase or decrease the lifting power of the spring for balancing beams of different weights by connecting the swinging bars and link bars in the apertures in the sector crank closer to or farther away from the axis of the bent end of the yoke member. The tension of the spring 29 can be changed by the adjusting screw 27.

What I claim is:—

1. In a balancing mechanism for cultivators, a yoke, provided with a journal, a beam connected to said yoke for horizontal and vertical movement, a bar pivotally mounted for vertical movement on said yoke, a sleeve mounted on said yoke journal carrying a sector crank which depends below and operates forward and rearward of the axis of said yoke journal, a lifting and adjustable connection between said bar and sector, and connecting means to connect the sector crank and pivot bar secured to the sector so as to have its lower end move below and to the rear of the journal.

2. In a balancing mechanism for cultivators, a yoke, a beam connected to said yoke for horizontal and vertical movement, a bar pivotally mounted for vertical movement on said yoke, a sleeve carrying a sector crank which depends below the axis of said yoke and journaled thereon, lifting and connecting means to connect the crank and pivot bar, means to connect the sector crank and pivot bar below the axis of the sleeve whereby more or less leverage is obtained.

3. In a balancing mechanism for cultivators, a yoke, a beam connected to said yoke for horizontal and vertical movement, a bar pivotally mounted for vertical movement on said yoke, a sleeve carrying a sector crank which depends below the axis of said yoke and is journaled thereon, lifting and connecting means to connect the crank and pivot bar, means to connect the sector crank and pivot bar below the axis of the sleeve whereby more or less leverage is obtained, and means to vary the lifting power of said balancing mechanism as described.

4. A balancing mechanism for cultivators comprising a yoke, a sleeve mounted on said yoke carrying a depending sector crank which is adapted to partially rotate below the horizontal axis of the yoke, a bar centrally pivoted on said yoke and combined lifting and balancing mechanism connected to said sector crank and pivoted bar, said connections with the crank being each located below the axis of the sleeve as described and set forth.

5. A balancing mechanism for cultivators comprising a yoke, a sleeve mounted on said yoke carrying a depending sector crank which is adapted to partially rotate below the horizontal axis of the yoke and on each side of the vertical axis of said yoke, a bar centrally pivoted on said yoke, and combined lifting and balancing mechanism connected to said sector crank and pivot bar, said connections with the crank being each located below said sleeve as described and set forth.

6. In a balancing and lifting mechanism for a cultivator beam, comprising a yoke provided with a journal, a bar pivotally connected thereto, a sleeve carrying a sector crank journaled on said journal, lifting means connected to the pivoted bar operating on one side of the horizontal axis of the yoke journal, and means connected to the sector crank below said journal and connected to the pivoted bar and disposed and operating opposite to the lifting means and adapted to be adjusted to increase or decrease the leverage of the lifting means.

In testimony whereof I affix my signature in presence of two witnesses.

FREDERICK C. WARNE.

Witnesses:
A. B. McLEAN,
E. W. WEESE.

---

Copies of this patent may be obtained for five cents each, by addressing the "Commissioner of Patents, Washington, D. C."